United States Patent

Shirakawa

[11] Patent Number: 5,673,421
[45] Date of Patent: Sep. 30, 1997

[54] DRAWING ARRANGING SYSTEM

[75] Inventor: Takahisa Shirakawa, Tokyo, Japan

[73] Assignee: NEC Corporation, Tokyo, Japan

[21] Appl. No.: 578,498

[22] Filed: Dec. 26, 1995

[30] Foreign Application Priority Data

Dec. 26, 1994 [JP] Japan ................................ 6-322635

[51] Int. Cl.$^6$ ........................................................ G06T 1/60
[52] U.S. Cl. .......................... 395/508; 395/501; 395/133; 395/141
[58] Field of Search ................................. 395/508, 511, 395/501, 523, 118, 133, 140–143

[56] References Cited

U.S. PATENT DOCUMENTS

| | | | |
|---|---|---|---|
| 5,386,520 | 1/1995 | Gillet | 395/410 |
| 5,530,947 | 6/1996 | Takasaki et al. | 395/135 |

FOREIGN PATENT DOCUMENTS

| | | |
|---|---|---|
| 3-136137 | 6/1991 | Japan . |
| 4-84371 | 3/1992 | Japan . |

*Primary Examiner*—Kee M. Tung
*Attorney, Agent, or Firm*—Foley & Lardner

[57] ABSTRACT

A drawing arranging system includes a first storage portion for storing coupling relationship between aggregate of characteristic points representing an objective drawing for processing and aggregate of relative vectors connecting characteristic points, a second storage portion for storing relational expressions as constraint conditions relating the lengths and directions of the relative vector, a parameter selecting portion for selecting one of parameters, for which values are not yet determined, according to a predetermined rule when the parameter of the relational expression corresponding to the characteristic points and the relative vectors of the drawings as object for processing is the parameter, for which the value is not yet determined, and a drawing arranging portion for sequentially fixing values of parameters selected by the parameter selecting portion and performing re-arrangement of the drawing by updating the attribute of the drawing.

12 Claims, 9 Drawing Sheets

FIG. 3

| CONSTRAINT | | CHARACTERISTIC POINT | RELATIVE VECTOR |
|---|---|---|---|
| HIGH | 1 | LIMITED TO ONE POINT (INCLUDE NO SOLUTION)<br>(1) $RAx$, $\Theta Ax$<br>(2) $RAx = 0$<br>(3) $\Theta Ax \neq \Theta Bx$<br>(4) $RAx \geq RAB$, $\Theta Bx$<br>(5) $RAx$, $RBx$, $\Theta Cx$<br>(6) $RAx$, $RBx$, $RCx$<br>(7) $\Theta Ax = \Theta Bx$,<br>$rAx / rBx = K$ | ONLY ONE SOLUTION IN SIMULTANEOUS EQUATION CONSTRAINT DEGREE AT BOTH END BEING 3 |
| | 2 | LIMITED TO TWO POINTS<br>(1) $RAx < RAB$, $\Theta Bx$<br>(2) $RAx$, $RBx$ | |
| | 3 | LIMITED ON THE LINE (HALF LINE, CIRCLE)<br>(1) $RAx$<br>(2) $\Theta Ax$ | |
| LOW | 4 | FREE<br>WHEN NO ABOVE CONDITIONS ARE ESTABLISHED | INFINITE NUMBER OF SOLUTION FOR SIMULTANEOUS EQUATION CONSTRAINT DEGREE AT BOTH END 2 OR LESS |

|   | a | b | c | d | e | f | g | h |
|---|---|---|---|---|---|---|---|---|
| a | — | rab |  |  |  |  |  |  |
| b | — | — | rbc |  | rbe |  |  |  |
| c | — | — | — | rcd |  | rcf |  |  |
| d | — | — | — |  |  |  |  |  |
| e | — | — | — | — | — |  | reg |  |
| f | — | — | — | — | — | — |  | rfh |
| g | — | — | — | — | — | — | — |  |
| a | — | Θab |  |  |  |  |  |  |
| b | — | — | Θbc |  | Θbe |  |  |  |
| c | — | — | — | Θ'cd |  | Θcf |  |  |
| d | — | — | — |  |  |  |  |  |
| e | — | — | — | — | — |  | Θeg |  |
| f | — | — | — | — | — | — |  | Θfh |
| g | — | — | — | — | — | — | — |  |

FIG. 9 (PRIOR ART)
A
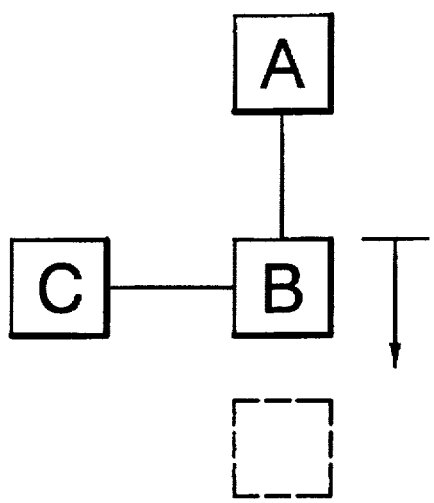
B
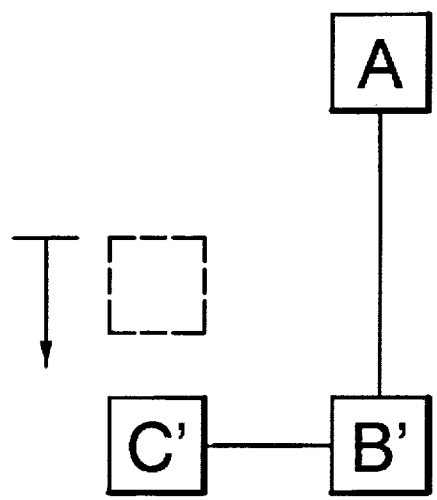

DRAWING ARRANGING SYSTEM

BACKGROUND OF THE INVENTION

1. Field of the Invention

The present invention relates to a drawing arranging system to be employed for adjusting the position and size of drawings in the drawing drafting process in a drawing function. The drawing function being implemented in a wordprocessor, a CAD system, a drawing reader system and so forth.

2. Description of the Related Art

Input of drawing in a wordprocessor, CAD system and so forth, is performed by inputting individual relatively simple drawings, such as quadrangles, circle, polygons, straight lines and so forth, and combining these elemental drawings in order to obtain the desired overall drawing. In general, the individual drawings arranged in the drawing have a certain association in the meaning. In such case, orderly adjusting or consolidating the positions and sizes of these drawings makes them easier to understand and provides a better appearance.

Normally, consolidation of the drawings to be used for drafting drawing, may be center alignment, horizontal alignment, vertical alignment, regulation of interval, regulation of length and so forth, as shown, for example, in FIG. 8. As can be appreciated from FIG. 8, by providing horizontal alignment and vertical alignment (see A) and by regulating angular interval (see B), the individual drawings can be neatly arranged to provide good appearance.

As means for consolidating the positions and sizes of the drawings, there is a method to employ a simple grid. The method employing the grid consolidates positions and sizes of the drawings by counting number of grating and employing a function for arranging the gradity point, center point and so forth, of the individual drawing on intersections of the calibration line called as grid set on the screen upon inputting and editing the drawings.

However, in the method employing the grid, it becomes necessary to adjust the size of the grid size and to count the number of the grids. This can make the operation complicated and cumbersome. On the other hand, when the position of the size, of the individual drawings, among the individual drawings which have already been consolidated for the positions and the sizes, changes it becomes necessary to perform an operation for modifying the positions and sizes of other drawings for matching the positions and sizes of respective drawings again.

In order to simplify the consolidation of the positions and sizes of the drawings, there have been proposed drawing arranging systems which mechanically consolidate the positions and sizes of the drawings on a screen.

An example of a prior art drawing arranging system has been disclosed in Japanese Unexamined Patent Publication (Kokai) No. Heisei 3-136173. In the above-identified publication, there has been disclosed a technology for maintaining the positional relationship between the individual drawings. The positional relationship is maintained by storing the shifting magnitude and shifting direction of the individual drawings which have already been shifted, and by shifting other drawings associated with the individual drawing in question. FIG. 9 is an illustration showing an example of operation of the drawing consolidation by the prior art. As shown in FIG. 9A, (A), (B) and (C) are connected, and FIG. 9B is shifted in the direction of the arrow. The drawing arranging system stores shifting of drawing (B). Also, as shown in FIG. 9(B), the drawing (C) is connected to the drawing (B) in parallel line, and the drawing (C) is shifted in the same shifting magnitude and in the same shifting direction as the drawing (B).

On the other hand, another prior art drawing arranging system has been disclosed in Japanese Unexamined Patent Publication No. Heisei 4-84371. In the above-identified publication, as shown in FIG. 10, the system includes an instruction input portion 1002 receiving the input of the drawing, an instruction analyzing portion 1005 for analyzing an input instruction of the drawing as information concerning drawing, a drawing information storage portion 1003 storing analyzed drawing information and maintaining the most recent drawing information, a drawing display portion 1001 for performing display of the drawing stored in the drawing information storage portion 1003, a relationship information storage portion 1004 storing the mutual relationship between the drawings, and a relation calculating portion 1006 for correcting drawing on the basis of the mutual relationship stored in the relationship information storage portion 1004. The system maintains relationship information respective of the input drawings and corrects the drawing information, thereby maintaining mutual relationship indicated by the relationship information.

FIG. 11 is an illustration showing an example of operation of the consolidation of the drawings in the prior art. As shown in FIG. 11, it is assumed that four quadrangles (R1) to (R4) are input to the mutually adjacent drawings. Namely, the drawing (R2) adjacent the right side of the drawing (R1), the drawing (R3) at the lower side of the drawing (R1) and the drawing (R4) at the right lower side of the drawing (R1) are arranged. On the other hand, each quadrangle is identified by left (x-coordinate of left side edge), top (y-coordinate of the upper side edge), width (lateral width of the quadrangle) and height (height of rectangle).

The instruction input portion 1002 feeds the instruction analyzing portion 1005 receiving inputs of respective of following equations.

$$R2.\ left = R1.\ left + R1.\ width \ldots (1)$$
$$R2.\ top = R1.\ top \ldots (2)$$
$$R2.\ height = R1.\ height \ldots (3)$$
$$R3.\ left = R1.\ left \ldots (4)$$
$$R3.\ top = R1.\ top + R1.\ height \ldots (5)$$
$$R3.\ height = R1.\ height\ (2) \ldots (6)$$
$$R4.\ top = R3.\ top \ldots (7)$$
$$R4.\ left = R2.\ left \ldots (8)$$
$$R4.\ width = R2.\ width \ldots (9)\ \text{and}$$
$$R4.\ height = R3.\ height \ldots (10)$$

The instruction analyzing portion 1005 analyzes of these equations and feeds the positional information to the relationship information storage portion 1004. The relationship information storage portion 1004 stores the relationship information of the drawings received from the instruction analyzing portion 1005.

Here, it is assumed that respective drawings (R1) to (R4) satisfy a relationship in the relationship storage portion 1004, and the width and height of the drawings (R1) are modified to new values "W" and "H". The information relating to the modification of the width and height of the drawing (R1) is input to the instruction input portion 1002. After analysis in the instruction analyzing portion 1005, the information relating to the modification of the width and height of the drawing (R1) is stored in the drawing information storage means 1003 and then reflected on the display by the drawing display portion 1001. At this time, the relationship calculating portion 1006 reads out the drawing information of the drawings (R1) to (R4) from the drawing information storage portion 1004. Then, the respective drawings indicated by the drawing information, are corrected for maintaining mutual relationship indicated by the relationship information.

Namely, the width (W) and the height (H) of the drawing (R1) are replaced with the foregoing equations (1), (3), (5) and (6) for deriving the position and height of the left side edge of the drawing (R2) and the position and height of the drawing (R3) for correction. Furthermore, the new position of the drawing (R2) is derived by transpositioning the foregoing equations (7) and (10) with the new position and height of the upper side edge of the drawing (R3) for deriving the positions and heights of the upper edge and the left side edge.

As a method for correcting the drawing information by the relationship calculating portion 1006, there are two equations set out below. At first, the relational expression is limited to one equation where the parameter is present at only left side of the equation. The varied parameters are replaced for the right side of the relationship equation to take the resultant value of the varying parameters. This method is generally referred to as "one-way constraints". Secondly, with transpositioning the varied parameter to the simultaneous equation to determine the values of the parameters varied by affect for solving the simultaneous equation. This method is generally referred to as "multi-way constraints."

However, the conventional drawing arranging system encounters the following defects.

In the first prior art, the drawing consolidation means of different systems are required, i.e., a corresponding number of systems to the number of kinds of drawing consolidations, therefore it is not practical to perform complex consolidation simultaneously satisfying a plurality of drawing consolidations. This is because that the combinations of the drawing consolidation to be set are present in the infinite number, the necessary consolidation means becomes too large to practice.

The second prior art is partially superior to the first prior art for capability of correction of drawings. However, the second prior art is required to express the specific element of the drawing in simultaneous linear equations relating to the (x,y) coordinates. Therefore, it is not possible in the second prior art to perform complicated adjustments such as for those making the angles at corners, those where inclinations of the lines are made equal to each other, those arranging a tangent of the circle, or those arranging an end point of the connection line on the circumference of the circle.

Furthermore, in case of the "one-way constraints," it is difficult to solve the relationship equation showing a composite constraint. For example:

$$R2.\text{left} = R1.\text{left} + R1.\text{width} \quad (11)$$
$$R1.\text{left} = R1.\text{Width} \quad (12)$$

Then, if the "R1. width" is the modified value and if the "R2. left" is derived by transpositioning with the new value, since the value of the "R1.left" is held unchanged in such modification, the relational expression of (11) cannot be established, finally. When a plurality of constraints are present, relationship between the constraints equations have to be considered. Thus, in general, the combined constraint cannot be solved.

On the other hand, in case of the constraint system of the multiway constraint, it becomes necessary to employ a calculation method required large calculation amount and large memory consumption, such as linear programming and so forth in the analyzing means for the parameters. Therefore, in the multiway constraint system, processing speed becomes low and large memory capacity is required. Such tendency becomes more and more significant in the greater system.

SUMMARY OF THE INVENTION

It is a first object of the present invention to provide a drawing arranging system which can simultaneously satisfy a plurality of drawing consolidation demands.

A second object of the present invention is to provide a drawing arranging system which can adjust an angle of a corner included in the drawing.

A third object of the present invention is to provide a drawing arranging system which can recognize arrangement of the drawings and automatically line them.

A fourth object of the invention is to provide a drawing arranging system which enables high speed process with low memory consumption.

According to the first aspect of the invention, a drawing arranging system comprising:

first storage means for storing coupling relationship between aggregate of characteristic points representing an objective drawing for processing and aggregate of relative vectors connecting characteristic points;

second storage means for storing relational expressions as constraint conditions relating the lengths and directions of the relative vector;

parameter selecting means for selecting one of parameters, for which values are not yet determined, according to a predetermined rule when the parameter of the relational expression corresponding to the characteristic points and the relative vectors of the drawings as object for processing is the parameter, for which the value is not yet determined; and drawing arranging means for sequentially fixing values of parameters selected by the parameter selecting means and performing re-arrangement of the drawing by updating the attribute of the drawing.

The parameter selecting means may includes:

constraint degree calculating means for calculating degree of constraint of the values possibly taken by the parameters with respect to parameters corresponding to coordinate values of the characteristic points and lengths and directions of the relative vectors having coupling relationship stored in the first storage means, which are not fixed the values; and determining parameter selecting means for selecting parameters for fixing one value among non-determined parameters having maximum constraint degree calculated by the constraint degree calculating means.

The constraint degree calculating means may calculate constraint degree at any steps among constraint degree of four stages of first stage where the value to be taken by the characteristic point is only one or the value of the relative vector is straightly limited, a second stage where the value to be taken by the characteristic point is limited to two points, a third stage where the value to be taken by the characteristic points is limited on the straight line or the circumference of the circle, and fourth stage other than those in other stages.

The drawing arranging means may comprise:

coordinate value determining means for determining coordinate value of the parameter on the basis of the coordinate values of characteristic points and lengths and directions of the relative vectors already determined and the coordinate value of the characteristic point corresponding to other parameter selected by the parameter selecting means, when the parameter selected by the parameter selecting means is the characteristic point;

relative vector determining means for determining coordinate value of the parameter on the basis of the coordinate values of characteristic points and lengths and directions of the relative vectors already determined when the parameter selecting means, when the parameter selected by the parameter selecting means is length and direction of the relative vector; and constraint condition analyzing means, responsive to demand from the relative vector determining means, for solving the relational expression stored in the relational expression storage means and transpositioning the value of the parameter determined by the relative vector determined means in the relative expression for re-calculation to establish simple form of expression.

The drawing arranging means may rearrange drawing drawn on a printing surface by updating attribute of the drawing on the printing surface, on which printing output is made by a printer.

The drawing arranging means may rearrange drawing drawn on a display screen of a display device by updating attribute of the drawing drawn on the display screen of the display device.

According to the second aspect of the invention, a drawing arranging system comprises:

first storage means for storing coupling relationship between aggregate of characteristic points representing an objective drawing for processing and aggregate of relative vectors connecting characteristic points;

second storage means for storing relational expressions as constraint conditions relating the lengths and directions of the relative vector;

constraint degree calculating means for calculating degree of constraint of the values possibly taken by the parameters with respect to parameters corresponding to coordinate values of the characteristic points and lengths and directions of the relative vectors having coupling relationship stored in the first storage means, which are not fixed the values;

determining parameter selecting means for selecting parameters for fixing one value among non-determined parameters having maximum constraint degree calculated by the constraint degree calculating means.

coordinate value determining means for determining coordinate value of the parameter on the basis of the coordinate values of characteristic points and lengths and directions of the relative vectors already determined and the coordinate value of the characteristic point corresponding to other parameter selected by the parameter selecting means, when the parameter selected by the parameter selecting means is the characteristic point;

relative vector determining means for determining coordinate value of the parameter on the basis of the coordinate values of characteristic points and lengths and directions of the relative vectors already determined when the parameter selecting means, when the parameter selected by the parameter selecting means is length and direction of the relative vector; and constraint condition analyzing means, responsive to demand from the relative vector determining means, for solving the relational expression stored in the relational expression storage means and transpositioning the value of the parameter determined by the relative vector determined means in the relative expression for re-calculation to establish simple form of expression.

The constraint degree calculating means may calculate constraint degree at any steps among constraint degree of four stages of first stage where the value to be taken by the characteristic point is only one or the value of the relative vector is straightly limited, a second stage where the value to be taken by the characteristic point is limited to two points, a third stage where the value to be taken by the characteristic points is limited on the straight line or the circumference of the circle, and fourth stage other than those in other stages.

The constraint degree calculating means may calculate degree of constraint of the possible value to be taken by the parameters with respect to the parameter, for which the value is not fixed, for the parameters of printing coordinate values on a printing surface, on which printing output is made by a printer and parameter of the relational expression corresponding to lengths and directions of the relative vectors;

the coordinate value determining means may determine a printing coordinate value of the parameter on the basis of the printing coordinate values corresponding to characteristic points corresponding to other parameters selected by the printing coordinate value of the characteristic points and lengths and directions on the printing surface of the relative vectors which are already determined, when the parameter selected by the parameter selecting means is the characteristic point; and the relative vector determining means may determine a value of the parameter on the basis of the printing coordinate values corresponding to characteristic points corresponding to other parameters selected by the printing coordinate value of the characteristic points and lengths and directions on the printing surface of the relative vectors which are already determined, when the parameter selected by the parameter selecting means is length and direction of the relative vector.

The constraint degree calculating means may calculate constraint degree at any steps among constraint degree of four stages of first stage where the value to be taken by the characteristic point is only one or the value of the relative vector is straightly limited, a second stage where the value to be taken by the characteristic point is limited to two points, a third stage where the value to be taken by the characteristic points is limited on the straight line or the circumference of the circle, and fourth stage other than those in other stages.

The constraint degree calculating means may calculate degree of constraint of the possible value to be taken by the parameters with respect to the parameter, for which the value is not fixed, for the parameters of pixel coordinate values on a display screen of a display device, on which pixel output is made by a printer and parameter of the relational expression corresponding to lengths and directions of the relative vectors;

the coordinate value determining means may determine a pixel coordinate value of the parameter on the basis of the pixel coordinate values corresponding to characteristic points corresponding to other parameters selected by the pixel coordinate value of the characteristic points and lengths and directions on a display screen of a display device of the relative vectors which are already determined, when the parameter selected by the parameter selecting means is the characteristic point; and the relative vector determining means may determine a value of the parameter on the basis of the pixel coordinate values corresponding to characteristic points corresponding to other parameters selected by the pixel coordinate value of the characteristic points and lengths and directions on a display screen of a display device of the relative vectors which are already determined, when the parameter selected by the parameter selecting means is length and direction of the relative vector.

Other objects, features and advantages of the present invention become apparent from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings:

FIG. 3 is an illustration showing a calculation reference of degree of constrain in a constrain degree calculating portion in the shown embodiment;

FIG. 9 is an illustration showing an example of execution of drawing consolidation in the conventional drawing arranging system;

DESCRIPTION OF THE PREFERRED EMBODIMENT

The present invention will be discussed hereinafter in detail in terms of the preferred embodiments of the invention with reference to the accompanying drawings. In the following description, numerous specific details are set forth in order to provide a thorough understanding of the present invention. It will be obvious, however, to those skilled in the art that the present invention may be practiced without these specific details. In some instances, well-known structures are not shown in detail in order to unnecessary obscure the present invention.

Figure 1:
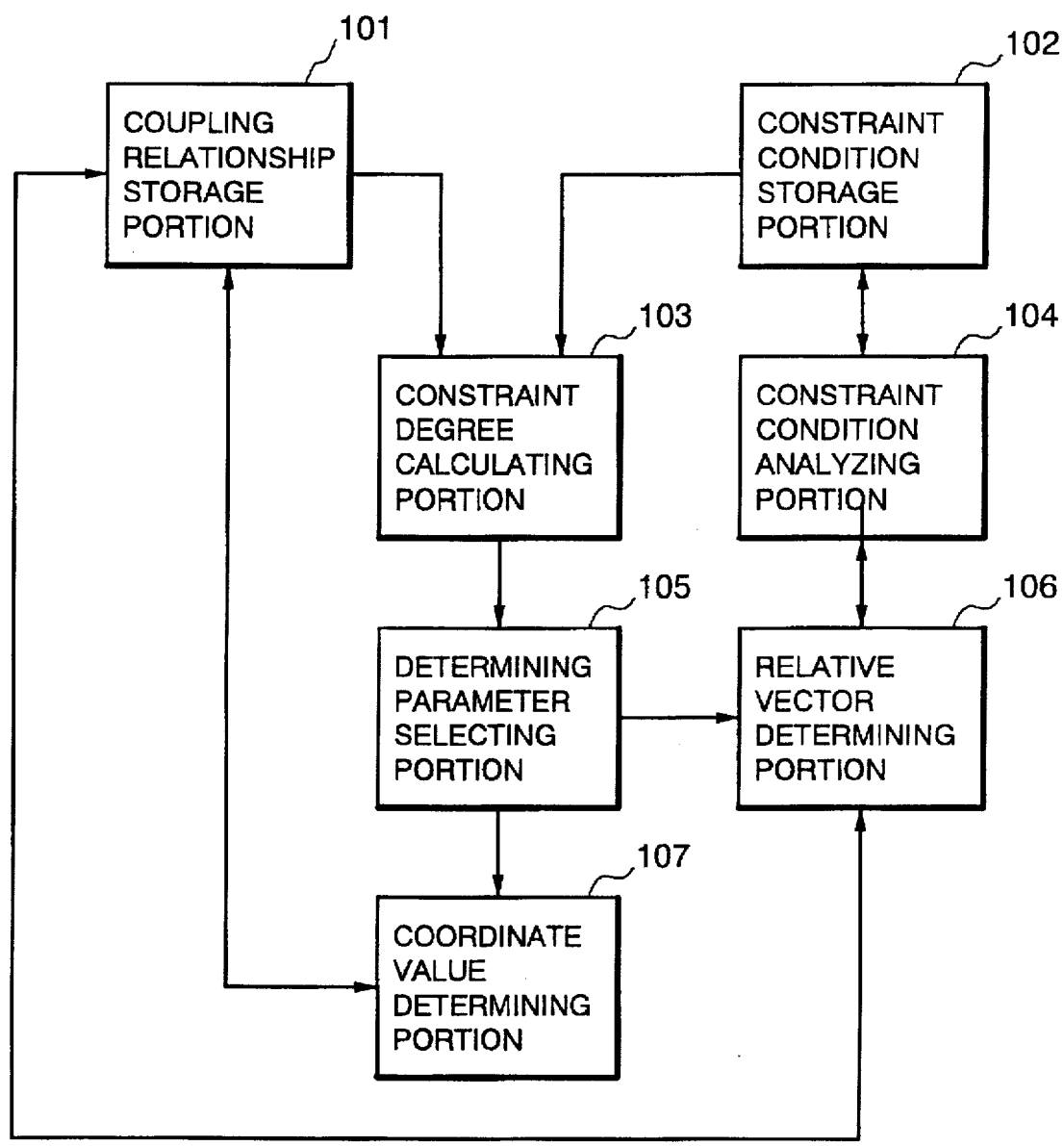
FIG. 1 is a block diagram showing a construction of the first embodiment of a drawing arranging system according to the present invention.

FIG. 1 is a block diagram showing a construction of the first embodiment of a drawing arranging system according to the present invention.

The shown embodiment of the drawing arranging system forms a desired drawing by adjusting the positions and sized of a plurality of drawing elements expressing drawing data including attribute, such as kind of drawing, coordinate value and so forth, by updating their attributes.

As shown, a embodiment of the drawing arranging system includes a coupling relationship storage portion 101 storing a coupling relationship of the drawing elements, a constraint condition storage portion 102 storing relational expressions of relative vectors in the drawing elements, a constraint degree calculating portion 103 calculating a degree of constraint in the coupling relationship between the drawing elements, a constraint condition analyzing portion 104 solving the relationship equation stored in the constraint condition storage portion 102, a determining parameter selecting portion 105 selecting a predetermined one of parameters calculated by the constraint degree calculating portion 103, a relative vector determining portion 106 determining value a of the parameter selected by the determining parameter selecting portion 105 and a coordinate value determining portion 107. It should be noted that FIG. 1 only illustrates a particular construction of the shown embodiment and other constructions are neglected.

The coupling relationship storage portion 101 is realized by employing a random-access-memory (hereinafter RAM) or so forth, and stores a coupling relationship between characteristic points representative of attributes of coordinate values of elements consisting objective drawings for consolidating processes and coupling relationships and relative vectors established by connecting two characteristic points.

The constraint condition storage portion 102 is realized by RAM or so forth, and stores relational expressions as constraint conditions showing comparison of lengths of a plurality of vectors and comparisons of angles of a plurality of vectors.

The constraint degree calculating portion 103 calculates a constraint degree as a freedom of the characteristic points and the relative vector, on the basis of the content of the coupling relationship storage portion 101 and the content of the constraint condition storage portion 102. Namely, the relationship among the characteristic points and coordinate values relating to the coupling relationship stored in the coupling relationship storage portion 101 and a parameter (register value) storing the length and direction of the relative vector, for the parameter values which have not been determined, the degree of constraints are calculated separately for respective stages of a first stage where the value to be taken by the characteristic point is only one or the value of the relative vector is straightly limited, and thus has the highest constraint degree, a second stage where the value to be taken by the characteristic point is limited to two points, a third stage where the value to be taken by the characteristic points is limited on the straight line or the circumference of the circle, and fourth stage other than those in other stages and thus having the lowest constraint degree.

The determining parameter selecting portion 105 is realized by employing a program controlled CPU or so forth, and selects the not yet determined characteristic point having the highest constraint degree and parameters as the length and direction of the relative vector by deriving the maximum value from the constraint degree. The constraint degree is derived by the constraint degree calculating portion 103. Then, when the kind of the parameter is the length and direction of the relative vector, the length and the direction identifying the selected parameter are output to the relative vector determining portion 106. On the other hand, when the kind of parameter is the characteristic point, the coordinate value of the characteristic point identifying the selected parameter is output to the coordinate value determining portion 107.

The constraint condition analyzing portion 104 is realized by employing the program controlled CPU and, in response to the demand from the relative vector determining portion 106, solves the relational expression stored in the constraint condition storage portion 102, by relating the value of the parameter, determined by the relative vector determining portion 106 in the relational expression, into a simplified form, if required, and maintains that condition. Then, when direct solution is present, the solution is output to the relative vector determining portion 106.

The relative vector determining portion 106 is realized by employing the program controlled CPU. When the kind of the parameter selected by the determining parameter selecting portion 105, uses the length and/or direction of the relative vector the value of (the relative vector is determined on the basis of the coordinate values of the already determined characteristic points, length and direction of (the relative vector identifying the parameter selected by the determining parameter selecting portion 105, and the solution output by the constraint condition analyzing portion 104), the relative vector determining portion 106 determines the value of the relative vector.

The coordinate value determining portion 107 is realized by employing the program controlled CPU. When the kind of the parameter selected by the determining parameter selecting portion 105 is the characteristic point, the coordinate value determining portion 107 derives the coordinate value of the characteristic point identifying the relative vectors which have already been determined and the parameter selected by the determining parameter determining portion 105, and thus determines the coordinate value of the characteristic point.

Next, the operation of the shown embodiment will be discussed in detail with reference to the flowchart of FIG. 2.

In the initial condition, the coupling relationship of the relative vector of the characteristic point is generated, on the basis of the drawing information and the constraint condition of the consolidation, and stored in the coupling relationship storage portion 101. The constraint condition for consolidation of the drawing is converted into the relational expression relating to the length and direction or angle of the relative vector and stored in the constraint condition storage portion 102. Moreover, concerning the coordinate value of the characteristic point and the length and direction of the relative vector, a "non-determined" flag is set when modification is permitted and a "determined" flag is set otherwise.

The constraint degree calculating portion 103 makes a judgement whether the non-determined parameter is present in the coordinate value of the characteristics point, and the length and direction of the relative vector, relating to the coupling relationship, stored in the coupling relationship storage portion 101 (step 201). If all of the parameter values are already determined, the process ends.

When a non-determined parameter is present, the constraint degree calculating portion 103 derives the constraint degree of each parameter according to the conditions determined, as illustrated in FIG. 3, for example, on the basis of the storage content of the coupling relationship storage portion 101 or the constraint condition storage portion 102 (step 202). It should be noted that, concerning the parameters for which the values are already determined, it is unnecessary to calculate the constraint degree again. The equations shown in the drawing are conditions concerning the constraint degree of the characteristic point x and established according to the following expression.

1: $(r_{xy})$ and $(\theta_{xy})$ represent the length (r component) and angle (θ component) of the relative vector between the characteristic point (x) and the characteristic point (y). 2: bold letter expression (R, θ) represents that the constraint degree of the length and direction of the relative vector is three. 3: (A), (B), (C) are mutually different characteristic points of constraint degree being three or points parallel shifted in the known magnitude from the mutually different characteristic points of constraint degree three. 4: (K) is a known constant.

Next, the determining parameter selecting portion 105 selects one of the non-determined parameters having the maximum constraint (step 203). Then, kind of the parameter selected at step 203 is checked (step 204). When the selected kind of parameter is the characteristic point, the process is advanced to step 205, and when the kind of the selected parameter is the relative vector, the process is advanced to step 212.

The coordinate value determining portion 107 reads out the coupling relationship from the coupling relationship storage portion 101 and retrieves the a restriction relating to the parameter selected at step 203 (step 205). Here, restriction is defined as follows. For instance, when the certain characteristic point is assumed to be restricted by the relative vector determined at the angle from the determined characteristic point, the coordinate of the characteristic point is limited on the half line. The degree of such limitation, united for certain parameter, is the constraint degree.

Next, the coordinate value determining portion 107 derives the value of the parameter satisfying the restriction derived at step 205 (step 206). When no solution can be attained due to too high of a constraint degree, the value satisfying the restriction in possible highest degree may be taken as the solution. On the other hand, when the solution cannot be determined for too low constraint degree, the value closest to the initial value of the parameter is taken as solution. For the parameter thus derived, the "determined" flag is set.

When the coordinate value determining portion 107 can derive the value directly through simultaneous equations, the constraint condition analyzing portion 104 for the relative vector, obtains the value of the parameter through the simultaneous equations and sets the "determined" flag for the obtained parameter (steps 207, 208).

On the other hand, the value cannot be obtained from the simultaneous equation, the relative vector determining portion 106 reads out the coupling relationship from the coupling relationship storage portion 101 and retrieves the restriction relating to the parameter selected at step 203 (steps 209, 210). Also, the relative vector determining portion 106 derives the value of the parameter satisfying the restriction derived at step 209 (step 210). When no solution can be attained due to too high constraint degree, the value satisfying the restriction in possible highest degree may be taken as the solution. On the other hand, when the solution cannot be determined for too low constraint degree, the value closest to the initial value of the parameter is taken as solution, for example. For the parameter thus derived, the "determined" flag is set.

The constraint condition analyzing portion 104 returns the values derived through steps 207 or 210 in the relational expression and maintains the relational expression in the constraint condition storage portion 102 in the simplest form.

Next, the operation of the shown embodiment will be discussed in further detail with respect to an example of consolidation of the concrete drawing.

Figures 4, 5:
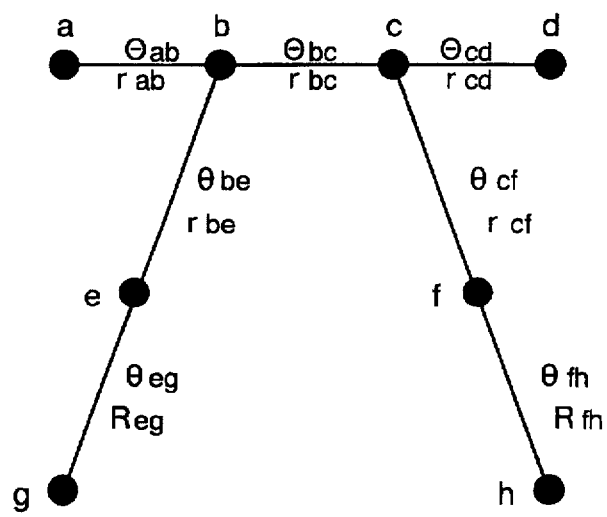
FIG. 4 is an illustration showing an example of concrete operation in the shown embodiment.
FIG. 5 is an illustration showing an example of display of coupling relationship between characteristic point and relative vector in FIG. 4.

FIG. 4 shows an example of the drawings which are the objective for consolidation in the shown embodiment. In the drawing, solid points represent characteristic points (a) to (h), and lines between the characteristic points represent the relative vectors.

With respect to the drawings illustrated in FIG. 3, the consolidation is performed for satisfying the following eight relational expressions.

$$r_{ab} = r_{cd}$$

$$r_{bc} = 2r_{ab}$$

$$r_{be} = r_{cf}$$

$$R_{eg} = R_{fh} - 10$$

$$\theta_{bc} = \theta_{eg}$$

$$\theta_{cf} = \theta_{fh}$$

$$\theta_{be} + \theta_{cf} = -\Pi$$

$$\theta_{ab} = \theta_{bc} - \theta_{cd} = 0$$

It should be noted that here all of the parameters can be modified. Also, in the following discussion, the determined parameter is expressed with the capital letter.

The coupling relationship of the characteristic point and the relative vector may take the manner of expression shown in FIG. 5, for example, to be stored in the coupling relationship storage portion 101. In FIG. 5, the length and direction of the relative vector are expressed with correspondence to the characteristic points as both ends thereof. By this, retrieval is made to the characteristic point to be reached by tracing the relative vector from certain characteristic point.

The constraint condition shown in FIG. 3 can be expressed by the simultaneous equation with respect to the length (r component) and the angle (θ component) of the relative vector. Expressing with the coefficient expansion matrix coupling coefficient matrix A and the constraint matrix become as follows:

$$rab\ rbc\ rcd: \begin{pmatrix} 1 & 0 & -1 & 0 \\ 0 & 1 & -2 & 0 \end{pmatrix} \quad (1)$$

$$rbe\ rcf: [1\ -1\ 0]$$

$$\theta be\ \theta eg\ \theta cf\ \theta fh = \begin{pmatrix} 1 & 0 & 0 & 1 & -\Pi \\ 0 & 1 & 0 & 1 & -\Pi \\ 0 & 0 & 1 & -1 & 0 \end{pmatrix}$$

The constraint condition is stored in the constraint condition storage portion 102 in a form of the coefficient expanded matrix solving the simultaneous equation. In the initial condition, the follwing parameters, a, b, c, d, e, f, g, h, $r_{ab}$, $r_{bc}$, $r_{cd}$, $r_{be}$, $\theta_{be}$, $\theta_{eg}$, $\theta_{cf}$ and $\theta_{fh}$ are in the non-determined states. Therefore, for these parameters, judgement at step 201 is becomes "non-determined)". Then process is advanced to step 202.

With reference to the foreoing constraint matrix, solution for all of (r) and (θ) are infinite number and no determined characteristic point is present, the constraint degree of all of the non-determined parameters is zero (step 202).

The determining parameter selecting portion 105 may select any parameter since the constraint degree of all of the parameters are the same at zero. Here, it is assumed that the characteristic point (a) is selected as the parameter "λ" having the maximum contraint degree (step 203).

The determining parameter selecting portion 105 selects that the maximum constraint degree parameter "λ" is contained in the coordinate value of the characterstics point. The coordinate value determining portion 107 maintains the initial value as the coordinate value since no associated fixed point and fixed relative vector is present. The coordinate value determining portion 107 determines the characterstic point (a) (steps 201, 205,206).

Returning to step 201, since the non-determined parameters are still present, the process is advanced to step 202. Then, the constraint degree calculating portion 103 performs calculation of the constraint degree. Here, it is not necessary to calculate the all of the constraint degrees, but for the constraints degrees of the parameters associated with the characteristic point (a).

The associated parameters, in the shown example, are the relative vector ($r_{ab}$) connected to (A) and the characteristic point (b) connected to (A) via the relative vector. By the calculation of the constraint degree calculating portion 103, the constraint degree of the characteristic point (b) is risen from zero to one (step 202).

The maximum constraint degree parameter "λ" is then the characteristic point (b). Therefore, the determining parameter selecting portion 105 selects the characteristic point (b) (step 203). Then, the maximum constraint degree parameter λ is the coordinate value of the characteristics point, the process is advanced to step 205 (step 204). The coordinate value determining portion 107 retrieves the fixed points and fixed relative vectors associated with the characteristic point (b). Here, the characteristic point "A" and the angle ($\theta_{ab}$) are detected (step 205). The coordinate value determining portion 107 calculates the coordinate value to determine the coordinate of the characteristic point (b) at the coordinate position satisfying θ=0 from the characteristic point (A) and the value is the closest to the initial value of the characteristic point (b) (step 206).

Since the similar operation will be repeated in the subsequent process, the redundant part of the disclosure will be neglected for maintaining the disclosure simple enough to facilitate clear understanding of the invention.

The constraint degree calculating portion 103 performs calculation of the constraint degree for the constraints degrees of the parameters associated with the characteristic point (B). Here, the associated parameters, in the shown example, are the relative vectors ($r_{ab}$), ($r_{bc}$), ($r_{be}$), ($\theta_{be}$), (c) and (e). By the calculation of the constraint degree calculating portion 103, the constraint degree of the parameter ($r_{ab}$) is risen to three (step 202). Then, the determining parameter selecting portion 105 selects the parameter ($r_{ab}$) (step 203).

Since the maximum constraint degree parameter λ selected by the determining parameter selecting portion 105 is the relative vector and cannot be directly determined by the simultaneous equation, the relative vector determining portion 106 retrieves the associated fixed points and the fixed relative vectors (step 212, 209, 210). Since the constraint degree is three for both ends is fixed at (A) and (B), the relative vector determining portion 106 determines the value of the relative vector with a distance between (A) and (B) (step 208). Then, the constraint condition analyzing portion 104 returns the parameter ($R_{ab}$) to the foregoing equation (1) to calculate solution again.

It should be noted that, when the general solution has been obtained by solving the simultaneous equation, the re-calculation of the solution and re-calculation of the constraint degree can be done at low cost by transpositioning the determined parameter for the constant item. The result of re-calculation is as follows:

$$rab\ rbc\ rcd: \begin{pmatrix} 1 & 0 & 2R_{ab} \\ 0 & 1 & R_{ab} \end{pmatrix} \quad (2)$$

$$rbe\ rcf: [\ 1\ \ -1\ \ 0\ ]$$

$$\theta be\ \theta eg\ \theta cf\ \theta fh = \begin{pmatrix} 1 & 0 & 0 & 1 & -\Pi \\ 0 & 1 & 0 & 1 & -\Pi \\ 0 & 0 & 1 & -1 & 0 \end{pmatrix}$$

The constraint degree calculating portion 103 calculates the constraint degree associated with the parameter ($R_{ab}$). The associated parameters are ($r_{bc}$) and ($r_{cr}$). Then the constraint dgrees of the parameters ($r_{bc}$) and ($r_{cr}$) are risen from zero to three (step 202). The determining parameter selecting portion 105 then selects the parameter ($r_{bc}$) as the maximum constraint degree parameter $\lambda$ (step 203). Since the kind of the maximum constraint degree parameter $\lambda$ selected by the determining parameter selecting portion 105 is relative vector and the value can be directly derived by the simultaneous equation, the constraint condition analyzing portion 104 determined the value by employing the solution (=$2R_{ab}$) (steps 212, 207, 208). Then, the constraint condition analyzing portion 104 returns the determined parameter ($R_{bc}$) to the foregoing equation (2) for re-calculation of the solution.

The constraint degree calculating portion 103 re-calculates the constraint degree associated with the parameter ($R_{bc}$). At this time, the associated parameter is (c). As a result of calculation, the constraint degree of the parameter (c) is risen from zero to three (step 202).

At this time, since the constraint degrees of the parameters (red) and (c) are the same and having the maximum constraint degrees, either one of the parameters may be selected. Here, the determining parameter selecting portion 105 selects the parameter ($r_{cd}$), on which the constraint degree becomes the current value at earlier timing the the parameter (c) (step 203).

Similarly to the case of the parameter ($r_{bc}$), the constraint condition analyzing portion 104 for the relative vector determines the value of the ($r_{cd}$) at ($R_{ab}$) (steps 204, 212, 207, 208, 209). By calculation of the constraint degree calculating portion 103, the constraint degree of the parameter (d) is risen to three (step 202).

The determining parameter selecting portion 105 selects the parameter (c) (step 203). Then, the coordinate value determining portion 107 determined the value of the parameter (c) with the coordinate value, which is in a distance of ($R_{bc}=2R_{ab}$) from (B) and ($\theta=0$) (steps 204 to 206). The constraint degree calculating portion 103 re-calculates the constraint degree for the parameters associated with the parameter (C).

Here, the associated parameters are (d) and (f). Through re-calculation, the constraint degree of the parameter (d) is risen to three (step 202).

The determining parameter selecting portion 105 selects the parameter (d) (step 203), the coordinate value determining portion 107 determined the value of the parameter (d) with the coordinate value, which is in a distance of ($R_{dc}=R_{ab}$) from (C) and ($\theta=0$) (steps 204 to 206). Since there is no parameter associated with the parameter (d), the constraint degree calculating portion 103 does not perform re-calculation of the constraint degree thus variation of the constraint degree is not caused (step 202).

Since the constraint degrees of all of the parameters are zero, the determining parameter selecting portion 105 selects the characteristic point (e) (step 203). The coordinate value determining portion 107 determines the characteristic point (e) (step 204 to 206). The initial value of this parameter is used as is.

Subsequently, the similar process is performed and this only results are shown.

When the parameter (E) is determined, constraint degrees of the parameters ($\theta_{be}$) and ($r_{be}$) are risen to three. From both ends (B) and (E), ($\theta_{be}$) and ($r_{be}$) are determined.

When the parameter ($\theta_{be}$) is determined, the solution of ($\theta_{eg}$), ($\theta_{cf}$) and ($\theta_{fh}$) are obtained directly from the simultaneous equation to rise the constraint degree to three. Then, ($\theta_{eg}$), ($\theta_{cf}$) and ($\theta_{fh}$) are determined.

When the parameter ($r_{be}$) is determined, the solution of the parameter ($r_{cf}$) is directly determined from the simultaneous equation to rise the constraint degree to three. Then, the parameter ($r_{cf}$) is determined.

Employing the parameters ($R_{eg}$) and ($\theta_{eg}$) from the point (E), the parameter (g) is determined.

Employing the parameters ($R_{cf}$) and ($\theta_{cf}$) from the point (C), the parameter (F) is determined.

Employing the parameters ($R_{fh}$) and ($\theta_{fh}$) from the point (C), the parameter (H) is determined.

Figure 6:
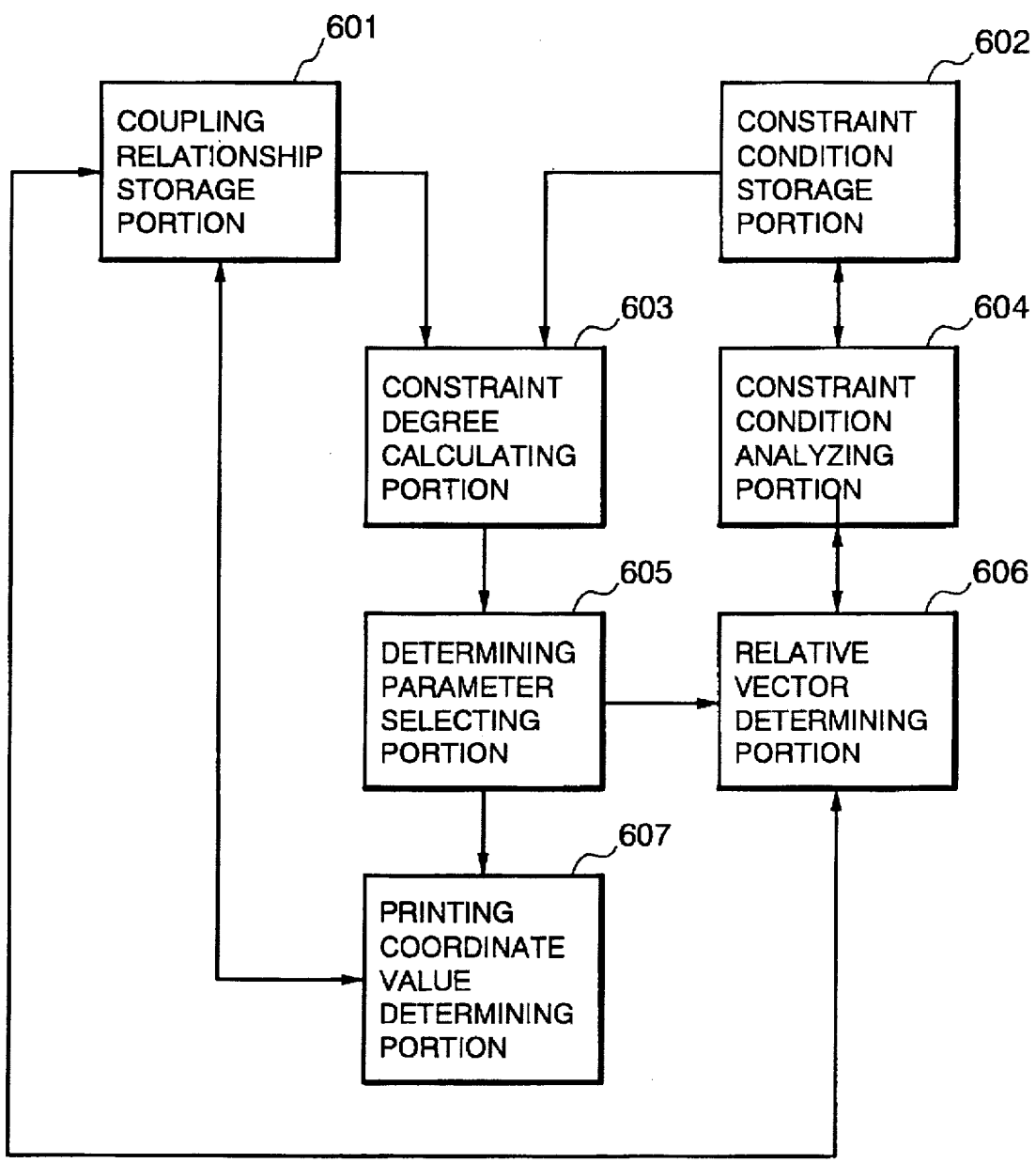
FIG. 6 is a block diagram of the second embodiment of the drawing arranging system according to the present invention.

FIG. 6 is a block diagram showing a construction of the second embodiment of the drawing arranging system according to the present invention.

The shown embodiment of the drawing arranging system forms desired drawings on a printing surface by adjusting the positions and sizes of a plurality of drawing elements on the printing surface expressed by the drawing data, including attributes such as kind of drawings and printing coordinate values, by updating the attributes.

As shown, the embodiment of the drawing arranging system includes a coupling relationship storage portion 601 storing coupling relationship of the drawing elements, a constraint condition storage portion 602 storing relational expressions of relative vector in the drawing elements, a constraint degree calculating portion 603 calculating a degree of constraint in the coupling relationship between the drawing elements, a constraint condition analyzing portion 604 solving the relationship equation stored in the constraint condition storage portion 602, a determining parameter selecting portion 605 selecting a predetermined one of parameters calculated by the constraint degree calculating portion 603, a relative vector determining portion 606 determining a value of the parameter selected by the determining parameter selecting portion 605 and a printing coordinate value determining portion 607. It should be noted that FIG. 6 only illustrates particular constructions of the shown embodiment and other constructions are neglected.

The coupling relationship storage portion 601 is realized by employing RAM or so forth, and stores a coupling relationship between characteristic points representative of an attribute of a printing coordinate value of elements consisting of objective drawings for consolidating processes and coupling relationships and relative vectors established by connecting two characteristic points.

The constraint condition storage portion 602 is realized by RAM or so forth, and stores relational expressions as a constraint condition, showing a comparison of lengths of a plurality of vectors and comparison of angles of a plurality of vectors.

The constraint degree calculating portion 603 calculates a constraint degree as freedom of the characteristic points and the relative vector, on the basis of the content of the coupling relationship storage portion 601 and the content of the constraint condition storage portion 602. Namely, among the characteristic points and coordinate values relating to the coupling relationship stored in the coupling relationship storage portion 601 and parameter (register value) storing the length and direction of the relative vector, for the parameters which have not been determined the values, the degree of constraint are calculated separately for respective stages of a first stage where the value to be taken by the characteristic point is only one or the value of the relative vector is straightly limited, and thus has the highest constraint degree, a second stage where the value to be taken by the characteristic point is limited to two points, a third stage where the value to be taken by the characteristic points is limited on the straight line or the circumference of the circle, and fourth stage other than those in other stages and thus have the lowest constraint degree.

The determining parameter selecting portion 605 is realized by employing a program controlled CPU and so forth, and selects the not yet determined characteristic point having the highest constraint degree and parameters as the length and direction of the relative vector by deriving the maximum value from the constraint degree derived by the constraint degree calculating portion 603. Then, when the kind of the parameter is the length and direction of the relative vector, the length and the direction identifying the selected parameter are output to the relative vector determining portion 606. On the other hand, when the kind of parameter is the characteristic point, the coordinate value of the characteristic point identifying the selected parameter, is output to the printing coordinate value determining portion 607.

The constraint condition analyzing portion 604, is realized by employing the program controlled CPU and in response to the demand from the relative vector determining portion 606, solves the relational expression stored in the constraint condition storage portion 602 by relating the value of the parameter determined by the relative vector determining portion 606 in the relational expression, into a simplified form, if required, and maintains that condition. Then, when a direct solution is present, the solution is output to the relative vector determining portion 606.

The relative vector determining portion 606 is realized by employing the program controlled CPU. When the kind of the parameter selected by the determining parameter selecting portion 605 uses the length and/or direction of the relative vector, the value of the relative vector is determined on the basis of the printing coordinate values of the already determined characteristic points, length and direction of the relative vector identifying the parameter selected by the determining parameter selecting portion 605, and the solution output by the constraint condition analyzing portion 604, the relative vector determining portion 606 determines the value of the relative vector.

The printing coordinate value determining portion 607 is realized by employing the program controlled CPU. When the kind of the parameter selected by the determining parameter selecting portion 605 is the characteristic point, the printing coordinate value determining portion 607 derives the printing coordinate value of the characteristic point identifying the relative vectors which have already been determined and the parameter selected by the determining parameter determining portion 605, and thus determines the printing coordinate value of the characteristic point.

Figure 7:
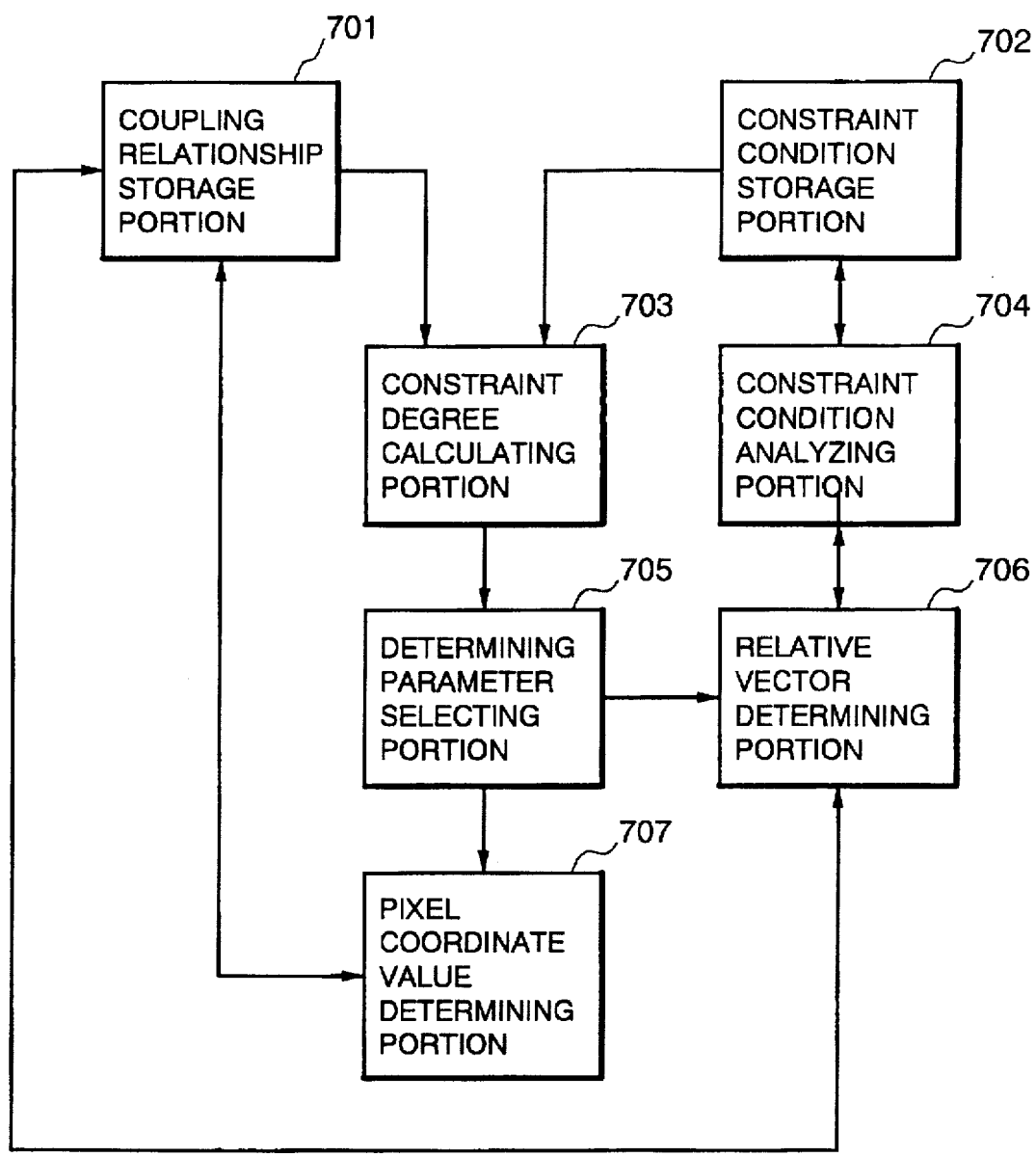
FIG. 7 is a block diagram of the third embodiment of the drawing arranging system according to the present invention.
Figure 8:
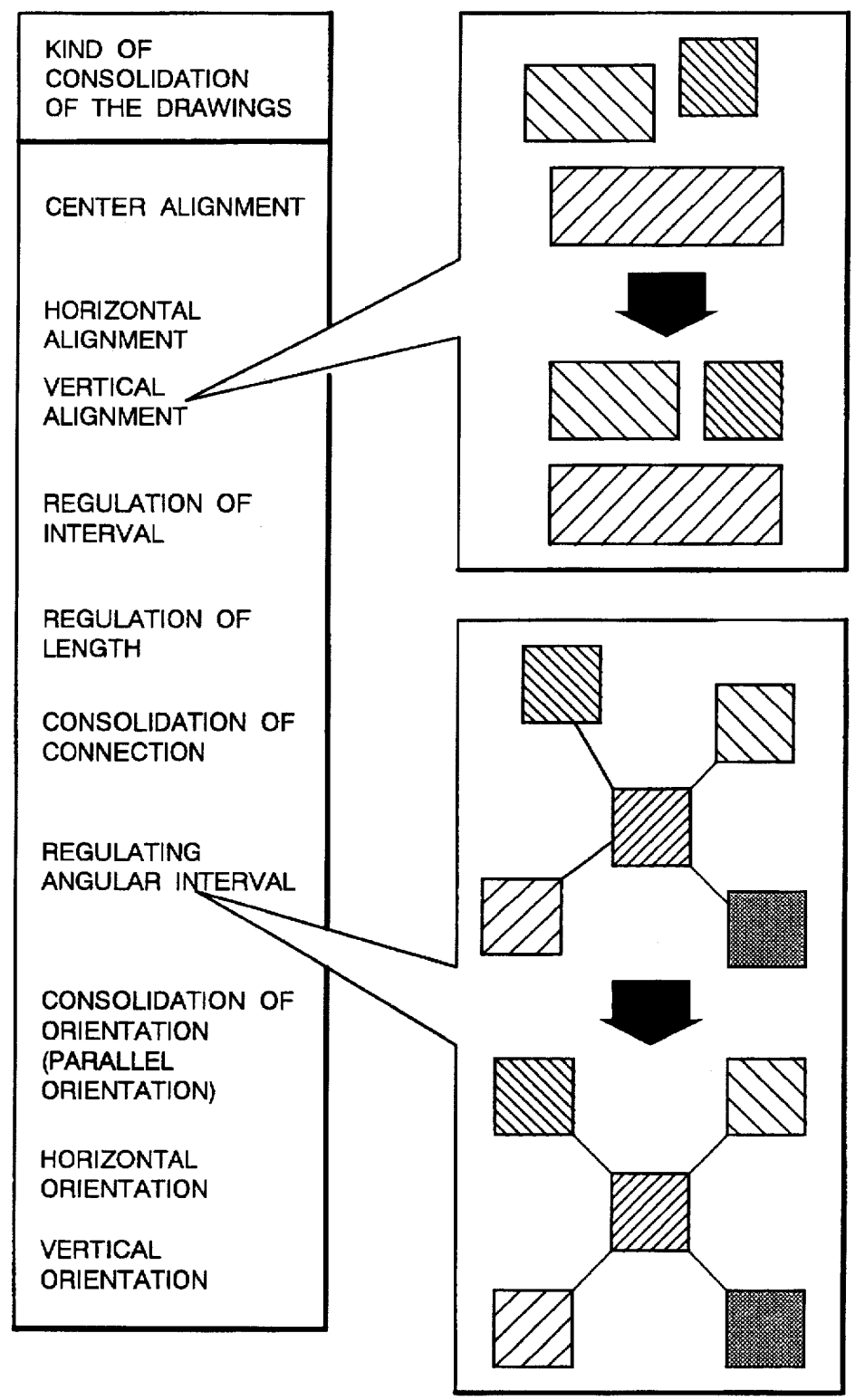
FIG. 8 is an illustration showing kinds of drawing consolidation.
Figure 10:
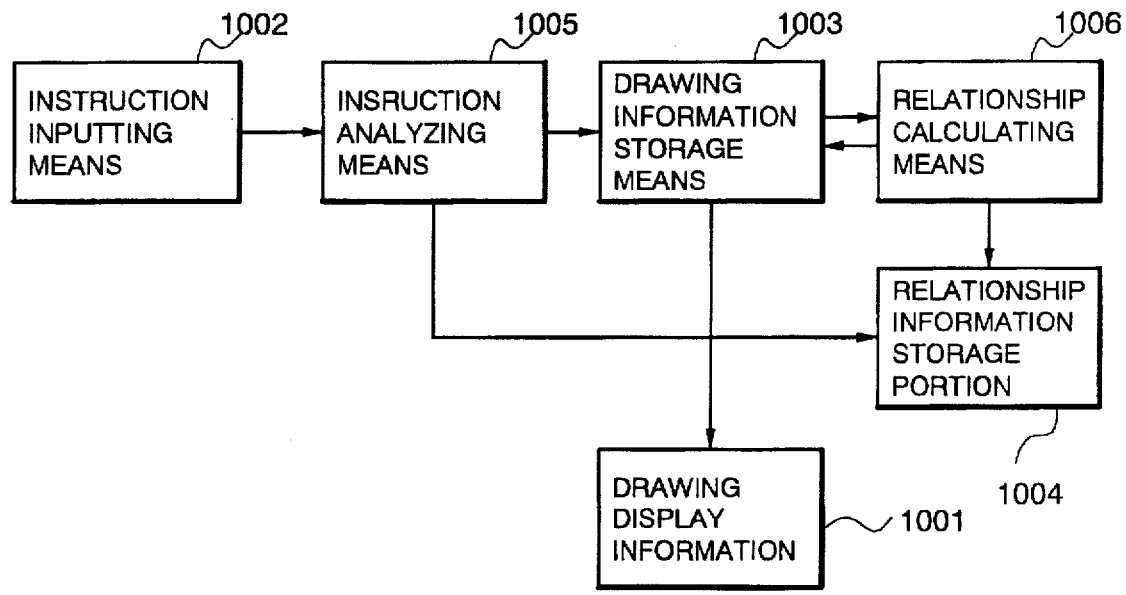
FIG. 10 is a block diagram showing an example of the construction of the conventional drawing arranging system.
Figure 11:
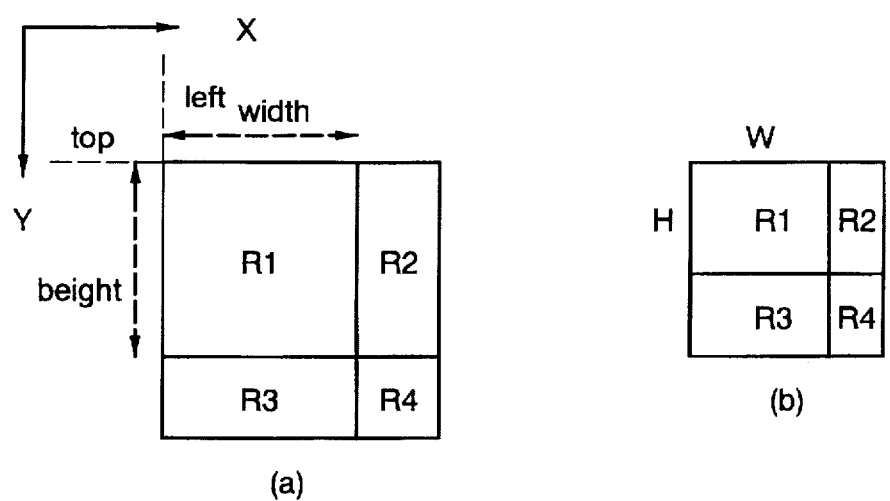
FIG. 11 is an illustration showing an example of execution of the drawing consolidation of an drawing correction of the write brothers.

FIG. 7 is a block diagram showing a construction of the third embodiment of the drawing arranging system according to the present invention.

The shown embodiment of the drawing arranging system is adapted to form the desired drawing on a display screen of a display device and forms desired drawings on a printing surface by adjusting the positions and sizes of a plurality of drawing elements on the display screen expressed by the drawing data, including attributes, such as kind of drawings and pixel coordinate values, by updating the attributes.

The shown embodiment of the drawing arranging system forms desired drawings on printing surface by adjusting the positions and sizes of a plurality of drawing elements on the printing surface expressed by the drawing data, including attributes, such as kind of drawings and printing coordinate values, by updating the attributes.

As shown, the shown embodiment of the drawing arranging system includes a coupling relationship storage portion 701 storing coupling relationship of the drawing elements, a constraint condition storage portion 702 storing relational expressions of relative vectors in the drawing elements, a constraint degree calculating portion 703 calculating a degree of constraint in the coupling relationship between the drawing elements, a constraint condition analyzing portion 704 solving the relationship equation stored in the constraint condition storage portion 702, a determining parameter selecting portion 705 selecting predetermined one of parameters calculated by the constraint degree calculating portion 703, a relative vector determining portion 706 determining value of the parameter selected by the determining parameter selecting portion 705 and a pixel coordinate value determining portion 707. It should be noted that FIG. 7 only illustrates particular constructions of the shown embodiment and other constructions are neglected.

The coupling relationship storage portion 701 is realized by employing RAM or so forth, and stores coupling relationship between characteristic points representative of an attribute of a pixel coordinate value of elements consisting of objective drawings for consolidating processes and coupling relationships and relative vectors established by connecting two characteristic points.

The constraint condition storage portion 702 is realized by RAM or so forth, and stores relational expressions as constraint conditions showing comparison of lengths of a plurality of vectors and comparison of angles of a plurality of vectors.

The constraint degree calculating portion 703 calculates a constraint degree as freedom of the characteristic points and the relative vector, on the basis of the content of the coupling relationship storage portion 701 and the content of the constraint condition storage portion 702. Namely, among the characteristic points and coordinate values relating to the coupling relationship stored in the coupling relationship storage portion 701 and parameter (register value) storing the length and direction of the relative vector, for the parameters which have not been determined the values, the degree of constraint are calculated separately for respective stages of first stage where the value to be taken by the characteristic point is only one or the value of the relative vector is straightly limited, and thus has the highest constraint degree, a second stage where the value to be taken by the characteristic point is limited to two points, a third stage where the value to be taken by the characteristic points is limited on the straight line or the circumference of the circle, and fourth stage other than those in other stages and thus have the lowest constraint degree.

The determining parameter selecting portion 705 is realized by employing a program controlled CPU or so forth, and selects the not yet determined characteristic point having the highest constraint degree and parameters, as the length and direction of the relative vector by deriving the maximum value from the constraint degree, derived by the constraint degree calculating portion 703. Then, when the kind of parameter is the length and direction of the relative vector, the length and the direction identifying the selected parameter are output to the relative vector determining portion 706. On the other hand, when the kind of parameter is the characteristic point, the coordinate value of the characteristic point identifying the selected parameter is output to the pixel coordinate value determining portion 707.

The constraint condition analyzing portion 704 is realized by employing the program controlled CPU and, in response to the demand from the relative vector determining portion 706, solves the relational expression stored in the constraint condition storage portion 702 by relating the value of the parameter determined by the relative vector determining portion 706 in the relational expression, into a simplified form, if required, and maintains that condition. Then, when direct solution is present, the solution is output to the relative vector determining portion 706.

The relative vector determining portion 706 is realized by employing the program controlled CPU. When the kind of parameter selected by the determining parameter selecting portion 705 uses the length and/or direction of the relative vector, the value of the relative vector is determined on the basis of the pixel coordinate values of the already determined characteristic points, length and direction of the relative vector identifying the parameter selected by the determining parameter selecting portion 705, and the solution output by the constraint condition analyzing portion 704, the relative vector determining portion 706 determines the value of the relative vector.

The pixel coordinate value determining portion 707 is realized by employing the program controlled CPU. When the kind of the parameter selected by the determining parameter selecting portion 705 is the characteristic point, the pixel coordinate value determining portion 707 derives the pixel coordinate value of the characteristic point identifying the relative vectors which have already been determined and the parameter selected by the determining parameter determining portion 705, and thus determines the pixel coordinate value of the characteristic point.

Figure 2:
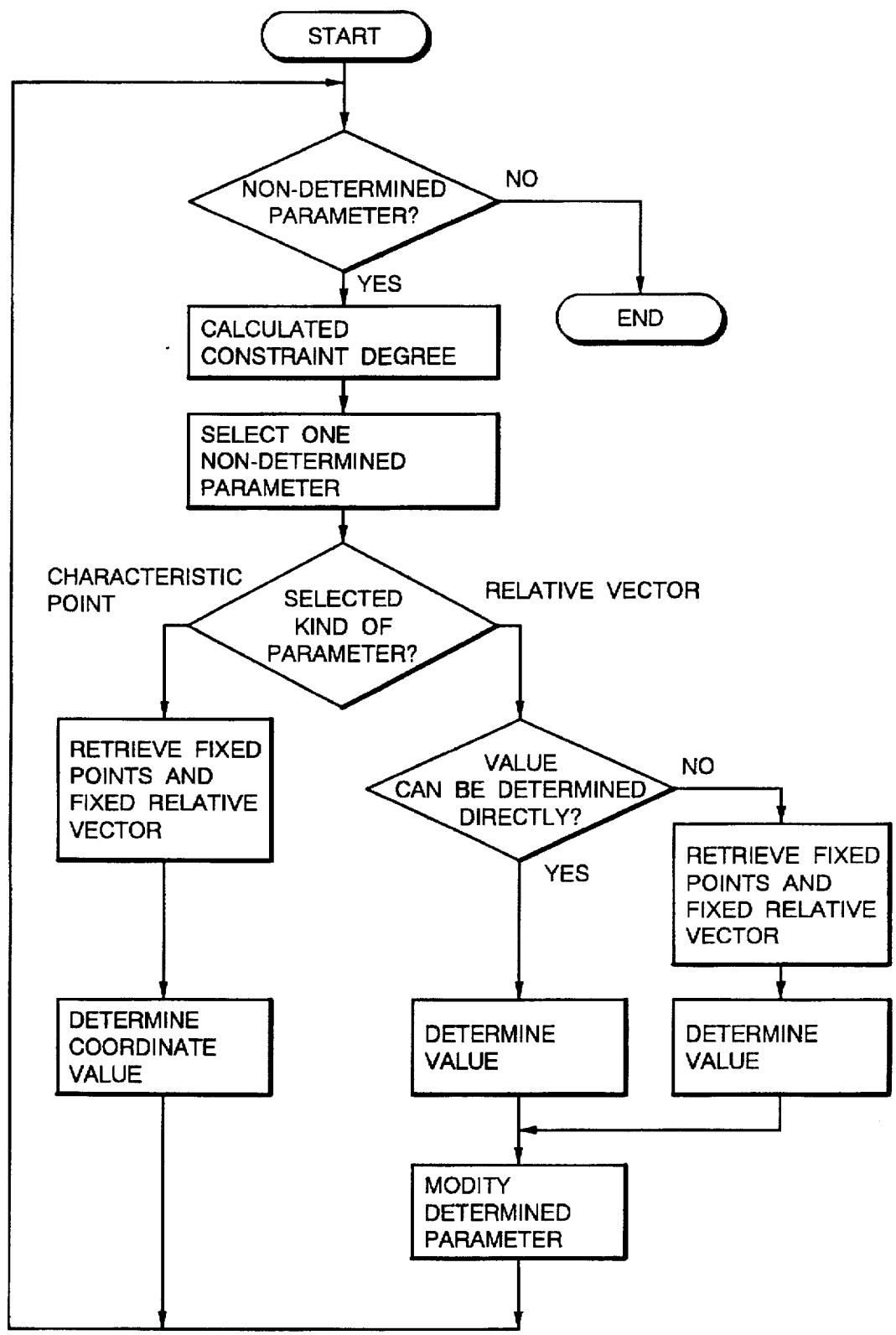
FIG. 2 is a flowchart showing an operation of the first embodiment of the drawing arrangement system.

In the process in the shown embodiment, the process is similar to that in the first embodiment shown in FIG. 2.

As set forth above, the drawing arranging system according to the present invention takes the drawings to be the object for arranging processes as an aggregate of characteristic points for information processing on information processing system, and expresses the constraint conditions applied to the characteristic points, expressing a relational expression relating to characteristic points and the lengths and angles of the relative vectors. By this, the drawing arranging system performs not only for consolidating the length and distance between the relative vectors, but also making two connection lines parallel or directing the connection line toward the center of the circuit. The drawing arranging system further performs consolidation of complicated drawings, such as consolidating the angle for the corner which has been difficult in the prior art.

Moreover, the present invention describes the declarative relational expression for of the constraint condition for consolidating the drawings. By this, automatic arrangement of the alignment of the drawings can be achieved.

Also, the present invention pays attention to arbitrariness of the positions of the characteristic points and relative vectors between the characteristic positions, and is constructed to determine the values in the order from one having lowest arbitrariness. In this manner, the system can be adapted to the complicated constraint condition where the position and length are to be adjusted simultaneously.

Furthermore, the present invention does not require repetition of calculation of large matrix, such as that required in the linear programming, high speed processing can be realized with low memory consumption.

The process procedure in the shown embodiment is similar to that in the first embodiment shown in FIG. 2.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A drawing arranging system comprising:

a first storage means for storing a coupling relationship between an aggregate of characteristic points representing a drawing, and for storing an aggregate of relative vectors connecting the characteristic points, wherein each of said relative vectors comprises a length and a direction;

a second storage means for storing relational expressions as constraint conditions, wherein the relational expressions relate the length and the direction of each of said relative vectors;

a parameter selecting means for selecting non-determined parameters from a plurality of parameters according to a predetermined rule; and a drawing arranging means for sequentially assigning values to the non-determined parameters selected by said parameter selecting means, and for performing re-arrangement of said drawing by updating an attribute of said drawing.

2. A drawing arranging system as set forth in claim 1, wherein said parameter selecting means includes:

a constraint degree calculating means for calculating a degree of constraint of the plurality of parameters with respect to the non-determined parameters corresponding to coordinate values of said characteristic points and said relative vectors; and a determining parameter selecting means for selecting, and assigning a value to, one of the non-determined parameters having a maximum constraint degree calculated by said constraint degree calculating means.

3. A drawing arranging system as set forth in claim 2, wherein said constraint degree calculating means calculates the constraint degree at any of the following stages: (i) a first stage wherein the value to be assigned is only one possible value or the value of a relative vector of the relative vectors is straightly limited, (ii) a second stage wherein the value to be assigned is limited to two points, (iii) a third stage wherein the value to be assigned is limited on a straight line or a circumference of a circle, and (iv) a fourth stage wherein the value to be assigned is other than those specified in said first stage, second stage, and said third stage.

4. A drawing arranging system as set forth in claim 1, wherein said drawing arranging means comprises:

coordinate value determining means for determining coordinate values of said non-determined parameters, when the non-determined parameters selected by said parameter selecting means are the characteristic points, wherein the coordinate values are determined on the basis of (i) the coordinate values of characteristic points and the length and the direction of said relative vectors already determined and (ii) the coordinate value of the characteristic points corresponding to a different parameter selected by the parameter selecting means;

relative vector determining means for determining coordinate values of said non-determined parameters, when the undetermined parameters selected by said parameter selecting means are the length and the direction of the relative vectors, wherein the coordinate values are determined on the basis of (i) the coordinate values of the characteristic points and said relative vectors already determined; and constraint condition analyzing means, responsive to said relative vector determining means, for solving the relational expressions, stored in said second storage means, and transpositioning the value of said non-determined parameters determined by said relative vector determined means, into said relational expressions for re-calculation to establish a simple form of expression.

5. A drawing arranging system as set forth in claim 1, wherein said drawing arranging means re-arranges the drawing drawn on a printing surface by updating the attribute of the drawing on said printing surface, wherein said printing surface is output to a printer.

6. A drawing arranging system as set forth in claim 1, wherein said drawing arranging means re-arranges the drawing drawn on a display screen of a display device by updating the attribute of the drawing drawn on said display screen of said display device.

7. A drawing arranging system comprising:

a first storage means for storing a coupling relationship between an aggregate of characteristic points representing a drawing, and for storing an aggregate of relative vectors connecting the characteristic points, wherein each of said relative vectors comprises a length and a direction;

a second storage means for storing relational expressions as constraint conditions, wherein the relational expressions relate the length and the direction of each of said relative vectors;

a constraint degree calculating means for calculating a degree of constraint of a plurality of parameters with respect to non-determined parameters corresponding to coordinate values of said characteristic points and said relative vectors;

a determining parameter selecting means for selecting, and assigning a value to, one of the non-determined parameters having a maximum constraint degree calculated by said constraint degree calculating means;

coordinate value determining means for determining coordinate values of said non-determined parameters, when the non-determined parameters selected by said determining parameter selecting means are the characteristic points, wherein the coordinate values are determined on the basis of (i) the coordinate values of characteristic points and lengths and directions of said relative vectors already determined and (ii) the coordinate value of the characteristic points corresponding to a different parameter selected by the parameter selecting means;

relative vector determining means for determining coordinate values of said non-determined parameters, when the non-determined parameters selected by said determining parameter selecting means are the length and the direction of the relative vectors, wherein the coordinate values are determined on the basis of (i) the coordinate values of the characteristic points and said relative vectors already determined; and constraint condition analyzing means, responsive to said relative vector determining means, for solving the relational expressions, stored in said second storage means, and transpositioning the value of said non-determined parameters determined by said relative vector determined means, into said relational expressions for re-calculation to establish a simple form of expression.

8. A drawing arranging system as set forth in claim 7, wherein said constraint degree calculating means calculates the constraint degree at any of the following stages: (i) a first stage wherein the value to be assigned is only one possible value or the value of a relative vector of the relative vectors is straightly limited, (ii) a second stage wherein the value to be assigned is limited to two points, (iii) a third stage wherein the value to be assigned is limited on a straight line or a circumference of a circle, and (iv) a fourth stage wherein the value to be assigned is other than those specified in said first stage, said second stage, and said third stage.

9. A drawing arranging system as set forth in claim 7, wherein said constraint degree calculating means calculates the degree of constraint of the plurality of parameters with respect to the non-determined parameters, for both (i) the non-determined parameters of printing coordinate values on a printing surface, wherein said printing surface is output to a printer, and (ii) the non-determined parameters of said relational expressions corresponding to the length and the direction of the relative vectors;

said coordinate value determining means determines a printing coordinate value of said non-determined parameters, when the non-determined parameters selected by said determining parameter selecting means are the characteristic points, on the basis of the printing coordinate values corresponding to characteristic points corresponding to other parameters selected by the printing coordinate value of the characteristic points and the length and the direction of said relative vectors already determined, on the printing surface; and said relative vector determining means determines a value of said non-determined parameters, when the non-determined parameters selected by said determining parameter selecting means are the length and the direction of the relative vectors, on the basis of the printing coordinate values corresponding to characteristic points corresponding to other parameters selected by the printing coordinate value of the characteristic points and the length and the direction of said relative vectors already determined on the printing surface.

10. A drawing arranging system as set forth in claim 9, wherein said constraint degree calculating means calculates the constraint degree at any of the following stages: (i) a first stage wherein the value to be assigned is only one possible value or the value of a relative vector of the relative vectors is straightly limited, (ii) a second stage wherein the value to be assigned is limited to two points, (iii) a third stage wherein the value to be assigned is limited on a straight line or a circumference of a circle, and (iv) a fourth stage wherein the value to be assigned is other than those specified in said first stage, said second stage, and said third stage.

11. A drawing arranging system as set forth in claim 7, wherein said constraint degree calculating means calculates the degree of constraint of the plurality of parameters with respect to the non-determined parameters, for both (i) the non-determined parameters of pixel coordinate values on a display screen of a display device, on which pixel output is made by a printer, and (ii) the non-determined parameters of said relational expressions corresponding to the length and the direction of the relative vectors;

said coordinate value determining means determines a pixel coordinate value of said non-determined parameters, when the non-determined parameters selected by said determining parameter selecting means are the characteristic points, on the basis of the pixel coordinate values corresponding to characteristic points corresponding to other parameters selected by the pixel coordinate value of the characteristic points and the length and the direction of said relative vectors already determined on a display screen of a display device; and said relative vector determining means determines a value of said non-determined parameters, when the non-determined parameters selected by said determining parameter selecting means are the length and the direction of the relative vectors, on the basis of the pixel coordinate values corresponding to characteristic points corresponding to other parameters selected by the pixel coordinate value of the characteristic points and the length and the direction of the relative vectors already determined on a display screen of a display device.

12. A drawing arranging system as set forth in claim 11, wherein said constraint degree calculating means calculates the constraint degree at any of the following stages: (i) a first stage wherein the value to be assigned is only one possible value or the value of a relative vector of the relative vectors is straightly limited, (ii) a second stage wherein the value to be assigned is limited to two points, (iii) a third stage wherein the value to be assigned is limited on a straight line or a circumference of a circle, and (iv) a fourth stage wherein the value to be assigned is other than those specified in said first stage, said second stage, and said third stage.

* * * * *